W. SNYDER.

Improvement in Combined Hoe and Seed-Dropper.

No. 130,757.            Patented Aug. 20, 1872.

ATTEST:
N. Stanley Sprague
H. F. Eberts

INVENTOR:
Watson Snyder
By Atty
Thos. S. Sprague

UNITED STATES PATENT OFFICE.

WATSON SNYDER, OF YPSILANTI, MICHIGAN.

IMPROVEMENT IN COMBINED HOES AND SEED-DROPPERS.

Specification forming part of Letters Patent No. 130,757, dated August 20, 1872.

*To whom it may concern:*

Be it known that I, WATSON SNYDER, of Ypsilanti, in the county of Washtenaw and State of Michigan, have invented a new and useful Improvement in Combined Hoe and Seed-Dropper; and I do declare that the following is a true and accurate description thereof, reference being had to the accompanying drawing and to the letters of reference marked thereon and being a part of this specification, in which—

Figure 1:
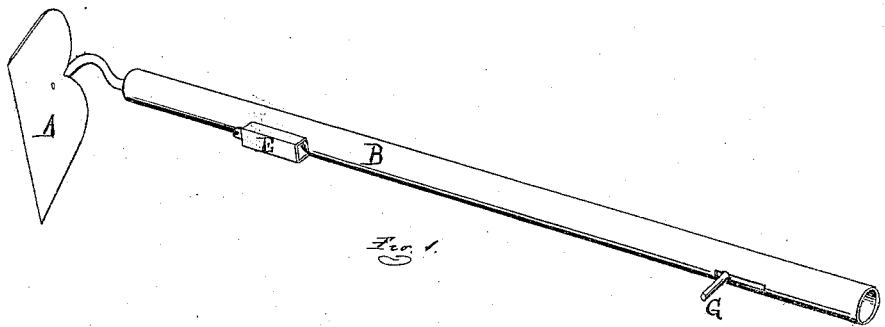
Figure 2:
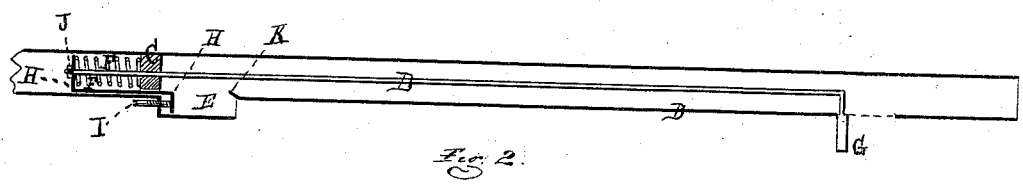

Figure 1 is a perspective view of my improved implement. Fig. 2 is a longitudinal section of the handle, showing the seed-dropping attachment.

Like letters refer to like parts in each figure.

The object of this invention is to provide an attachment to an ordinary hoe, by means of which seed may be accurately measured and dropped, the seed being carried in a hollow handle.

The invention consists in the combination, with a hoe-handle, of the peculiar devices for measuring and delivering the seed.

In the accompanying drawing, A represents an ordinary goose-neck hoe rigidly secured to the handle B. This handle B is hollow through its entire length, the top being open while the lower end is closed. The top should be open to allow the seed to be placed in the hollow chamber. C is a plug or stop rigidly secured within the handle, and has a hole through it, through which the operating-rod D passes. E is a delivery-chamber secured to the under side of the handle, and immediately over a slot in said handle, through which slot the seed passes into the delivery-chamber. F is a spiral spring inclosing the lower end of the rod D, this latter extending upward through the hollow handle and terminating in a trigger, G, which passes through a slot in the handle near its upper end, and within easy reach of the hand of the operator. H is a slide, or, rather, a double-slide bucket, one end of which fills the area, in cross-section, of the delivery-chamber E, while the other occupies a similar position within the hollow handle B. That portion of the slide which operates within the chamber E is provided with a set-screw, I, which passes through the lower and closed end of said chamber, and by its means the receiving capacity of the chamber is increased or diminished, as desired, and to suit the size or quantity of the seed to be delivered from the upper end of said chamber, which is open for that purpose. That portion of the slide which operates within the hollow handle is rigidly connected with the portion just described, and through it passes the lower end of the rod D, which terminates in a nut, J, or other similar or suitable device, which will prevent said rod from being drawn through the slide. The spiral spring F is placed around said rod, between the rigid stud or stop C and the slide in the handle. An inwardly-projecting lip, K, near the top of the opening or passage from the handle to the chamber, prevents the clogging of the slide which operates within said chamber.

The hollow handle being filled with seed—for instance, corn—and the capacity of the delivery-chamber being gaged to receive the necessary amount of seed required to be planted in a hill, the hill is opened by the hoe, and the operator withdraws the trigger toward him, when the slide in the delivery-chamber forces the seed therein upward in said chamber and out of its mouth into the hill, which is then covered by the hoe. Relieving the trigger from pressure, the spiral spring compels the slide to resume its original position, when the delivery-chamber again fills, the seed dropping therein from their own gravity.

What I claim as my invention, and desire to secure by Letters Patent, is—

The arrangement of the operating-rod D, spring F, slide H, and delivery-chamber E with the hollow handle B, when the parts are constructed to operate substantially as and for the purposes set forth.

WATSON SNYDER.

Witnesses:
   THOS. S. SPRAGUE,
   H. S. SPRAGUE.